(12) United States Patent
Suwabe et al.

(10) Patent No.: US 8,663,777 B2
(45) Date of Patent: Mar. 4, 2014

(54) ALUMINUM-TITANATE-BASED CERAMIC HONEYCOMB STRUCTURE, ITS PRODUCTION METHOD, AND STARTING MATERIAL POWDER FOR PRODUCING SAME

(75) Inventors: Hirohisa Suwabe, Minato-ku (JP);
Masaru Yoshida, Moka (JP);
Tomomasa Kumagai, Miyako-gun (JP);
Hideya Yamane, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 817 days.

(21) Appl. No.: 12/743,134

(22) PCT Filed: Nov. 14, 2008

(86) PCT No.: PCT/JP2008/070821
§ 371 (c)(1),
(2), (4) Date: Jul. 21, 2010

(87) PCT Pub. No.: WO2009/063997
PCT Pub. Date: May 22, 2009

(65) Prior Publication Data
US 2010/0310819 A1    Dec. 9, 2010

(30) Foreign Application Priority Data

Nov. 14, 2007 (JP) ................................. 2007-295914
Mar. 11, 2008 (JP) ................................. 2008-060465

(51) Int. Cl.
*B32B 3/12* (2006.01)
*C04B 35/00* (2006.01)
*C04B 35/478* (2006.01)
*C04B 35/82* (2006.01)

(52) U.S. Cl.
USPC ............. 428/116; 55/523; 422/180; 501/134; 501/136

(58) Field of Classification Search
USPC ............. 428/116–118; 422/177–181; 501/11, 501/32, 81, 80, 134–136, 153, 118–120, 501/121, 122; 55/523
See application file for complete search history.

(56) References Cited

U.S. PATENT DOCUMENTS

| | | | |
|---|---|---|---|
| 4,277,539 A | | 7/1981 | Keller et al. |
| 5,066,626 A | * | 11/1991 | Fukao et al. .................. 501/134 |
| 5,346,870 A | * | 9/1994 | Noguchi et al. .............. 501/136 |

(Continued)

FOREIGN PATENT DOCUMENTS

| | | |
|---|---|---|
| EP | 1 911 732 A1 | 4/2008 |
| JP | 60-5544 B2 | 6/1979 |

(Continued)

*Primary Examiner* — David Sample
*Assistant Examiner* — Nicholas W Jordan
(74) *Attorney, Agent, or Firm* — Sughrue Mion, PLLC

(57) ABSTRACT

A ceramic honeycomb structure having a large number of flow paths partitioned by porous cell walls, the cell walls comprising at least main crystals of aluminum titanate, in which MgO and $SiO_2$ are dissolved to form a solid solution, and glass phases, the glass phases containing 40-80% by mass of $SiO_2$ and 1-20% by mass of MgO, the average size of the glass phases being 30 μm or less in a cross section of the cell walls, and the area ratio of the glass phases to the total area of the main crystals of aluminum titanate and the glass phases being 2-12% in a cross section of the cell walls, and its production method.

10 Claims, 3 Drawing Sheets

(56) References Cited

U.S. PATENT DOCUMENTS

| | | | |
|---|---|---|---|
| 7,071,135 B2 * | 7/2006 | Ogunwumi et al. | 501/134 |
| 7,259,120 B2 * | 8/2007 | Ellison et al. | 501/134 |
| RE42,646 E * | 8/2011 | Fukuda et al. | 501/134 |
| 2007/0224110 A1 * | 9/2007 | Fukuda et al. | 423/598 |
| 2010/0096783 A1 * | 4/2010 | Tokudome et al. | 264/630 |
| 2010/0230870 A1 * | 9/2010 | Noguchi et al. | 264/624 |
| 2013/0062275 A1 * | 3/2013 | Kobashi et al. | 210/483 |

FOREIGN PATENT DOCUMENTS

| | | |
|---|---|---|
| JP | 05-085818 A | 4/1993 |
| JP | 05-279116 A | 10/1993 |
| JP | 2006-096634 A | 4/2006 |
| WO | 2005/105704 A1 | 11/2005 |
| WO | 2006/039255 A2 | 4/2006 |
| WO | 2007/015495 A1 | 2/2007 |

\* cited by examiner

ALUMINUM-TITANATE-BASED CERAMIC HONEYCOMB STRUCTURE, ITS PRODUCTION METHOD, AND STARTING MATERIAL POWDER FOR PRODUCING SAME

CROSS REFERENCE TO RELATED APPLICATIONS

This application is a National Stage of International Application No. PCT/JP2008/070821 filed Nov. 14, 2008, claiming priority based on Japanese Patent Application No. 2007-295914 filed Nov. 14, 2007 and Japanese Patent Application No. 2008-060465 filed Mar. 11, 2008, the contents of all of which are incorporated herein by reference in their entirety.

FIELD OF THE INVENTION

The present invention relates to an aluminum-titanate-based ceramic honeycomb structure, its production method, and a starting material powder for producing it, particularly to an aluminum-titanate-based ceramic honeycomb structure suitable for a ceramic honeycomb filter for cleaning PM-containing exhaust gases discharged from diesel engines, etc., its production method, and a starting material powder for producing it.

BACKGROUND OF THE INVENTION

An exhaust gas emitted from diesel engines contains PM (particulate matter) based on carbonaceous soot and SOF (soluble organic fraction) of high-boiling-point hydrocarbons. When such exhaust gas is released into the atmosphere, it may adversely affect human beings and the environment. For this reason, a PM-capturing ceramic honeycomb filter, which may be called "honeycomb filter" in short, has been disposed in an exhaust pipe connected to a diesel engine. One example of honeycomb filters for purifying an exhaust gas by removing PM is shown in FIGS. 1(a) and 1(b). The honeycomb filter 10 comprises a ceramic honeycomb structure (simply called honeycomb structure) comprising porous cell walls 2 defining large numbers of outlet-side-sealed flow paths 3 and inlet-side-sealed flow paths 4, and an outer peripheral wall 1, and upstream-side plugs 6a and downstream-side plugs 6c alternately sealing the outlet-side-sealed flow paths 3 and the inlet-side-sealed flow paths 4 on the exhaust-gas-inlet-side end 8 and the exhaust-gas-outlet-side end 9 in a checkerboard pattern.

Honeycomb filters are required to capture particulate matter from exhaust gases at high efficiency, with low pressure loss to reduce burden on engines. However, the more particulate matter captured, the higher pressure loss occurs due to the clogging of cell wall pores. Accordingly, it is necessary to burn off the captured particulate matter to regenerate honeycomb filters. Because the honeycomb filters are thus repeatedly exposed to high temperatures to burn particulate matter, they are required to have high heat resistance and high heat shock resistance. Materials for forming porous cell walls have conventionally been cordierite ($5SiO_2$-$2Al_2O_3$-$2MgO$) and silicon carbide (SiC).

Cordierite cell walls are resistant to heat shock cracking, meaning excellent heat shock resistance, because of as low a thermal expansion coefficient as about $10\times10^{-7}/°$ C., but the combustion of much accumulated particulate matter puts honeycomb filters at too high temperatures, making it likely that the cell walls are partially melted. Accordingly, precise control is needed to avoid excess elevation of the burning temperatures, resulting in increase in the production and running costs of exhaust-gas-cleaning apparatuses.

When cell walls are formed by silicon carbide, honeycomb structures may be cracked by heat shock stress despite excellent heat resistance, because of as large a thermal expansion coefficient as $40\times10^{-7}/°$ C. To reduce heat stress, divided honeycomb filter parts may be integrally bonded, but its effects are not sufficient, only suffering a high cost due to division and bonding.

Recently proposed to solve the above problems is the use of aluminum titanate ($Al_2TiO_5$) for honeycomb structures. Aluminum titanate has heat resistance exceeding 1700° C., a small thermal expansion coefficient, and excellent heat shock resistance. Aluminum titanate has a small thermal expansion coefficient because of microcracks generated in a sintering process due to the anisotropic thermal expansion coefficient of aluminum titanate crystals, while the microcracks reduce the mechanical strength of the honeycomb structures. Namely, conventional aluminum titanate suffers contradiction to meet a small thermal expansion coefficient and high strength. Also, because conventional aluminum titanate is usually decomposed in a temperature range of 800-1280° C., it cannot be used stably in this temperature range for a long period of time. To solve such problems of conventional aluminum titanate, the following technologies are disclosed.

WO 05/105704 discloses an aluminum magnesium titanate crystal structure having a thermal expansion coefficient of $-6\times10^{-6}$ to $6\times10^{-6}$ (1/K), which is formed by a solid solution, in which part of Al atoms on at least a surface layer of an aluminum magnesium titanate crystal having a composition represented by $Mg_xAl_{2(l-x)}Ti_{(1+x)}O_5$, wherein $0.1 \leq x<1$, are substituted by Si atoms, the ratio of aluminum magnesium titanate remaining when kept at 1100° C. for 300 hours in the air being 50% or more, and its production method. WO 05/105704 describes that the above structure has heat resistance inherent in aluminum titanate and an extremely small thermal expansion coefficient, as well as excellent heat shock resistance, high thermal decomposability and high mechanical strength. However, higher-performance honeycomb filters are recently demanded, and the honeycomb filter described in WO 05/105704 is insufficient to meet both a low thermal expansion coefficient and high strength, and not satisfactory in pressure loss characteristics. Accordingly, the method of WO 05/105704 cannot produce a honeycomb filter having heat shock resistance, strength, high-temperature stability and pressure loss characteristics improved to practically acceptable levels.

WO 06/39255 discloses a ceramic body comprising 50-95% by mass of aluminum titanate crystal phases and 5-50% by mass of glass phases, the glass phases having a composition comprising 50-90% of $SiO_2$, 1-25% of $Al_2O_3$, 0.5-10% of $TiO_2$, 0.5-20% of $R_2O$, wherein R is an element selected from the group consisting of Li, Na, K, Ru, Cs and Fr, and 0.5-20% of R'O, wherein R' is an element selected from the group consisting of Be, Mg, Ca, Ba and Ra, and its production method, and describes that the ceramic body has excellent shock resistance and heat cycle resistance and is suitably usable at high temperatures. However, recent demand of higher-performance honeycomb filters makes the honeycomb of WO 06/39255 insufficient to meet both a low thermal expansion coefficient and high strength, and unsatisfactory in pressure loss characteristics and thermal stability at 800-1250° C. Accordingly, the method of WO 06/39255 cannot produce honeycomb filters having heat shock resistance, strength, high-temperature stability and pressure loss characteristics improved to practically acceptable levels. Though the production method is not described in detail, Examples indicate that pulverized glass of a particular composition, which is fused at 1600° C., should be used as a starting material, suffering a high production cost.

JP 5-85818 A discloses aluminum titanate ceramics having crystal phases composed of 60-85% of aluminum titanate, 10-25% of rutile, 2-10% of corundum and 2-10% of mullite, and 5% or less of glass phases, and its production method, and describes that the aluminum titanate has excellent heat cycle durability and insert-castability. However, because the aluminum titanate ceramics of JP 5-85818 A contain as much rutile as 10-20%, they have large thermal expansion coefficients and poor heat shock resistance. In addition, in view of recent demand of higher-performance honeycomb filters, its pressure loss characteristics and thermal stability at 800-1250° C. are not satisfactory. Accordingly, the method of JP 5-85818 A cannot produce honeycomb filters having heat shock resistance, strength, high-temperature stability and pressure loss characteristics improved to practically acceptable levels.

JP 60-5544 B discloses a silicate-containing aluminum titanate ceramic material having a chemical composition comprising 50-60% by weight of $Al_2O_3$, 40-45% by weight of $TiO_2$, 2-5% by weight of kaolin and 0.1-1% by weight of magnesium silicate, and made of starting materials having particle sizes of 0.6 μm or less, and describes that it has high shock resistance and mechanical strength. However, recent demand of higher-performance honeycomb filters makes the honeycomb of JP 60-5544 B insufficient to meet both a low thermal expansion coefficient and high strength, and unsatisfactory in pressure loss characteristics and thermal stability at 800-1250° C. Accordingly, the method of JP 60-5544 B cannot produce honeycomb filters having heat shock resistance, strength, high-temperature stability and pressure loss characteristics improved to practically acceptable levels.

JP 2006-96634 A discloses a porous aluminum titanate ceramic body having porosity of 51-75%, an average pore size of 10-40 μm, and a prescribed pore size distribution, and describes that such structure can provide ceramic honeycomb filters with excellent heat resistance and heat shock resistance, low pressure loss and practically acceptable strength. However, recent demand of higher-performance honeycomb filters makes the porous ceramic body of JP 2006-96634 A unsatisfactory in thermal stability at 800-1250° C. It is also insufficient to meet both a low thermal expansion coefficient and high strength, and further improvement is needed to obtain honeycomb filters having heat shock resistance, strength, high-temperature stability and pressure loss characteristics improved to practically acceptable levels.

As described above, conventional aluminum titanate is insufficient to meet both a low thermal expansion coefficient and high strength, and further improvement is needed to obtain honeycomb filters having heat shock resistance, strength, high-temperature stability and pressure loss characteristics improved to practically acceptable levels.

OBJECT OF THE INVENTION

Accordingly, an object of the present invention is to provide an aluminum-titanate-based ceramic honeycomb structure having excellent heat shock resistance, pressure loss characteristics and thermal stability at 800-1250° C. and improved strength, its production method, and a starting material powder for producing it.

DISCLOSURE OF THE INVENTION

As a result of intensive research in view of the above object, the inventors have found that by regulating the composition, size and ratio of glass phases in a ceramic honeycomb structure comprising main crystals of aluminum titanate and glass phases, large numbers of fine microcracks are generated in a sintering process, thereby providing the honeycomb structure with a small thermal expansion coefficient and improved strength. The present invention has been completed based on such finding.

Thus, the aluminum-titanate-based ceramic honeycomb structure of the present invention has a large number of flow paths partitioned by porous cell walls, the cell walls comprising at least main crystals of aluminum titanate, in which MgO and $SiO_2$ are dissolved to form a solid solution, and glass phases; the glass phases containing 40-80% by mass of $SiO_2$ and 1-20% by mass of MgO; the average size of the glass phases being 30 μm or less in a cross section of the cell walls; and the area ratio of the glass phases to the total area of the main crystals of aluminum titanate and the glass phases being 2-12% in a cross section of the cell walls.

Another aluminum-titanate-based ceramic honeycomb structure of the present invention has a large number of flow paths partitioned by porous cell walls, the cell walls comprising at least main crystals of aluminum titanate, in which MgO and $SiO_2$ are dissolved to form a solid solution, and glass phases; the glass phases containing 40-80% by mass of $SiO_2$ and 1-20% by mass of MgO; the average size of the glass phases being 30 μm or less in a cross section of the cell walls; and the mass ratio of the glass phases to the total of the main crystals of aluminum titanate and the glass phases being 1% or more by mass and less than 10% by mass.

The amounts of MgO and $SiO_2$ dissolved in the main crystals are preferably 0.2-5% by mass and 0.1-1.5% by mass, respectively.

The cell walls preferably have porosity of 40-70%, an average pore size of 10-40 μm, and a pore distribution deviation σ[=log(D20)-log(D80)] of 0.4 or less, wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume (pore volume accumulated in a range from the maximum pore size to a particular pore size), and D80<D20.

The cell walls preferably have air permeability of $2 \times 10^{-12}$ $m^2$ or more.

The honeycomb structure preferably has an A-axis compression strength of 4 MPa or more. The cell walls preferably have a thermal expansion coefficient of $12 \times 10^{-7}$/° C. or less. When the cell walls are kept in an atmosphere at 1100° C.100 hours, the ratio of the remaining aluminum titanate is preferably 95% or more.

The method of the present invention for producing an aluminum-titanate-based ceramic honeycomb structure comprises the steps of mixing 100 parts by mass of a powder material comprising alumina powder containing 0.05-0.5% by mass of $Na_2O$ and titania powder containing 0.5% or less by mass of $Na_2O$ at a molar ratio of 47/53 to 53/47, with at least 1-6 parts by mass of silica powder and 0.5-5 parts by mass of magnesia source powder having an average particle size of 5 μm or less; molding the mixed powder material to a honeycomb structure; heating the resultant molding at an average speed of 10° C./hr to 100° C./hr in a temperature range of 1300° C. to 1350° C.; and sintering it at the highest keeping temperature of 1400-1650° C. to obtain an aluminum-titanate-based ceramic honeycomb structure comprising at least main crystals of aluminum titanate, in which MgO and $SiO_2$ are dissolved to form a solid solution, and glass phases.

The alumina powder preferably has an average particle size of 0.1-10 μm, the titania powder preferably has an average particle size of 0.05-3 μm, and the silica powder preferably has an average particle size of 0.1-30 μm. The alumina powder more preferably has an average particle size of 2-6 μm.

A pore-forming material preferably is added to the mixed powder material.

The molding is preferably kept at the highest keeping temperature for 24 hours or longer.

The starting material powder of the present invention for producing an aluminum-titanate-based ceramic honeycomb structure comprising at least main crystals of aluminum titanate, in which MgO and $SiO_2$ are dissolved to form a solid solution, and glass phases, comprises 100 parts by mass of a powder material comprising alumina powder containing 0.05-0.5% by mass of $Na_2O$ and titania powder containing 0.5% or less by mass of $Na_2O$ at a molar ratio of 47/53 to 53/47, and at least 1-6 parts by mass of silica powder, and 0.5-5 parts by mass of magnesia source powder having an average particle size of 5 μm or less.

DESCRIPTION OF THE PREFERRED EMBODIMENTS

[1] Aluminum-Titanate-Based Ceramic Honeycomb Structure (1) First Honeycomb Structure The first aluminum-titanate-based ceramic honeycomb structure of the present invention (simply called "honeycomb structure" below) having a large number of flow paths partitioned by porous cell walls is characterized in that the cell walls comprise at least main crystals of aluminum titanate, in which MgO and $SiO_2$ are dissolved to form a solid solution, and glass phases, that the glass phases contain 40-80% by mass of $SiO_2$ and 1-20% by mass of MgO, that the average size of the glass phases is 30 μm or less in a cross section of the cell walls, and that the area ratio of the glass phases to the total area of the main crystals of aluminum titanate, in which MgO and $SiO_2$ are dissolved to form a solid solution, and the glass phases is 2-12% in a cross section of the cell walls.

With MgO and $SiO_2$ dissolved in main crystals of aluminum titanate, the honeycomb structure has improved thermal stability at 800-1250° C. With 40-80% by mass of $SiO_2$ and 1-20% by mass of MgO contained in the glass phases, the crystals of aluminum titanate are bonded with the glass phases, and fine microcracks are introduced into cell walls in a sintering process, thereby providing the honeycomb structure with a smaller thermal expansion coefficient and improved strength.

The glass phases contain 40-80% by mass of $SiO_2$ and 1-20% by mass of MgO. The glass phases can be made amorphous by 40-80% by mass of $SiO_2$, and provided with low melting points by 1-20% by mass of MgO. Accordingly, a liquid phase is generated in a temperature range in which aluminum titanate is synthesized from alumina material powder and titania material powder in a sintering process, resulting in a sintered composite structure having main crystals of aluminum titanate containing MgO and $SiO_2$ and bonded with fine glass phases. The strong bonding of the main crystals of aluminum titanate with fine glass phases makes finer microcracks generated by the anisotropic thermal expansion of aluminum titanate, and increases their number. When the amount of MgO contained in glass phases is less than 1% by mass, the glass phases do not have a sufficiently low melting point, so that the glass phases are made relatively bulky. When the amount of MgO is 1% or more by mass, the more the amount of MgO, the finer the glass phases. Thus, the dispersion of finer glass phases in the cell walls makes finer microcracks generated in the aluminum titanate crystal phases, thereby providing the honeycomb structure with a smaller thermal expansion coefficient and improved strength. On the other hand, when the amount of MgO contained in glass phases is more than 20% by mass, the glass phases have too low a melting point, so that the honeycomb structure has a low softening temperature and lose heat resistance inherent in aluminum-titanate-based ceramics.

Figure 2A:
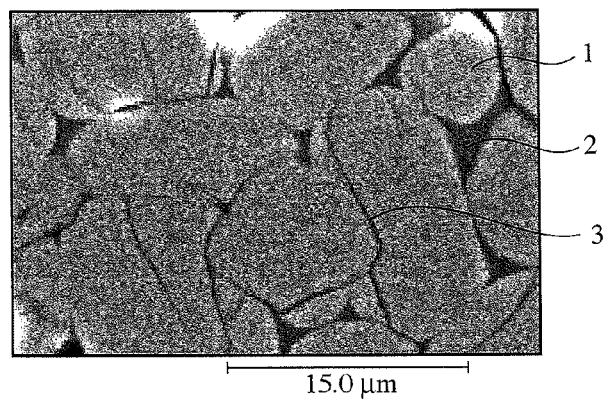
FIG. 2(a) is a SEM photograph showing a cell wall cross section of the honeycomb structure.
Figure 2B:
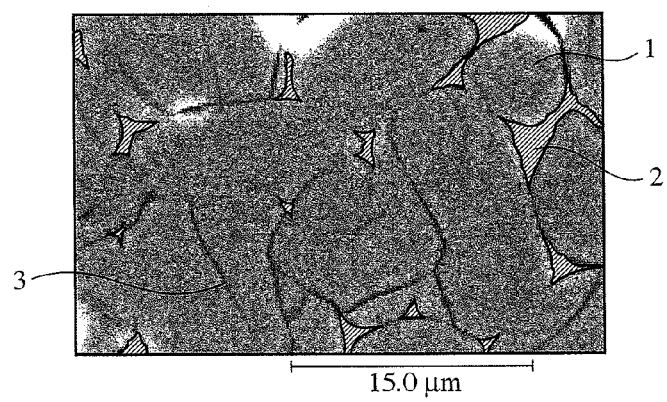
FIG. 2(b) is a schematic view showing a cell wall cross section of the honeycomb structure with glass phases hatched.

The average size of the glass phases is 30 μm or less in a cross section of cell walls. When the average size is more than 30 μm, the main crystals of aluminum titanate are not strongly constrained, resulting in larger microcracks with a smaller number, so that the honeycomb structure does not have a sufficiently low thermal expansion coefficient and sufficient strength. A SEM photograph of a cross section of cell walls of the honeycomb structure is shown in FIG. 2(a). The glass phases 2 exist in gaps between crystal phases 1 of aluminum titanate as shown by hatching in FIG. 2(b), and their maximum lengths are regarded as the sizes of the glass phases 2. The average size of the glass phases 2 are determined by averaging the sizes of glass phases 2 measured at 20 sites. The average size of the glass phases is preferably 20 μm or less, more preferably 10 μm or less, most preferably 5 μm or less.

The area ratio of the glass phases to the total area of main crystals of aluminum titanate, in which MgO and $SiO_2$ are dissolved to form a solid solution, and glass phases is 2-12% in a cross section of cell walls. When the area ratio of the glass phases is less than 2%, aluminum titanate crystals are not strongly bonded, and microcracks are not made sufficiently fine, failing to provide the honeycomb structure with improved strength. The area ratio of the glass phases exceeding 12% makes the glass phases too influential, providing the honeycomb structure with low strength and a large thermal expansion coefficient. The area ratio of the glass phases is preferably 2-8%, more preferably 3-6%.

The glass phases preferably contain, in addition to 40-80% by mass of $SiO_2$ and 1-20% by mass of MgO, 10-40% by mass of $Al_2O_3$, 0.5-10% by mass of $TiO_2$, 0.5-5% by mass of $Na_2O$, and 0.5-5% by mass of $K_2O$, Such composition provides the glass phases with a low melting point, and makes microcracks finer, providing the honeycomb structure with a low thermal expansion coefficient and high strength. The inclusion of $Na_2O$ and $K_2O$ both in 0.5-5% by mass makes the melting point of glass phases further lower, so that the honeycomb structure has both low thermal expansion coefficient and high strength. The glass phases more preferably contain 50-70% by mass of $SiO_2$, 2.5-10% by mass of MgO, 15-30% by mass of $Al_2O_3$, 1-8% by mass of $TiO_2$, 1-4% by mass of $Na_2O$, and 1-4% by mass of $K_2O$.

0.2-5% by mass of MgO and 0.1-1.5% by mass of $SiO_2$ are preferably dissolved in the main crystals of aluminum titanate. The dissolving of MgO and $SiO_2$ in these ranges improves the thermal stability of aluminum-titanate-based ceramics at 800-1250° C., and provides aluminum titanate crystals with improved strength, thereby improving the strength of the honeycomb structure. The more preferred amount of MgO dissolved is 0.5-3% by mass, and the more preferred amount of $SiO_2$ dissolved is 0.1-0.6% by mass.

Figure 2C:
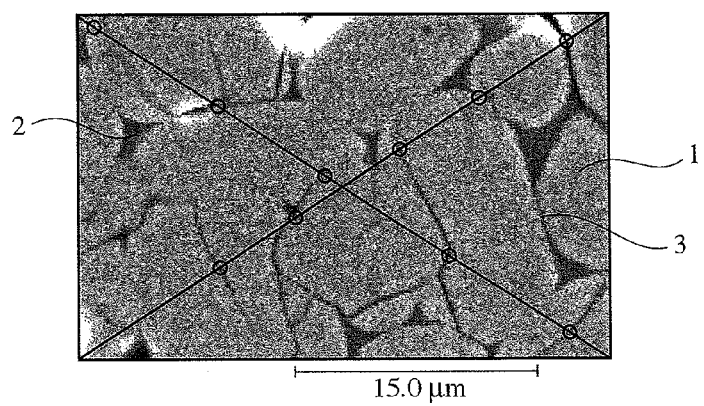
FIG. 2(c) is a view for explaining the method of counting the number of microcracks generated in the crystal phases in the honeycomb structure.

As shown in FIG. 2(c), the number of microcracks 3 can be determined on a SEM photograph showing a cross section of cell walls by a line-crossing method, in which the number of microcracks 3 crossing an arbitrary straight line is counted, and converted to a number per a unit length of the line excluding that crossing pores. The number of microcracks determined by the line-crossing method is preferably 50 or more per mm, more preferably 100 or more per mm.

The honeycomb structure substantially comprises main crystals of aluminum titanate, in which MgO and $SiO_2$ are dissolved to form a solid solution, and glass phases containing at least MgO and $SiO_2$, and it may further contain trace amounts of crystals such as $TiO_2$, $Al_2O_3$, spinel, mullite, etc. in ranges not affecting the effects of the present invention. Although their amounts are not restrictive, they are 10% or less, preferably 5% or less by mass, based on the total of main crystals and other crystals. The total amount of crystal phases is determined from an X-ray diffraction pattern of a powdery sample, by the (230) plane diffraction intensity ($I_{AT(230)}$) of aluminum titanate, the (104) plane diffraction intensity ($I_{corundum(104)}$) of $Al_2O_3$ corundum, the (110) plane diffraction intensity ($I_{rutile(110)}$) of rutile $TiO_2$, and the (311) plane diffraction intensity ($I_{spinel(311)}$) of spinel, etc. CaO, BaO, $Fe_2O_3$, $Li_2O$, SrO, $Y_2O_3$, etc. may also be contained in ranges not affecting the effects of the present invention.

(2) Second Honeycomb Structure

The second aluminum-titanate-based ceramic honeycomb structure of the present invention has a large number of flow paths partitioned by porous cell walls, the cell walls comprising at least main crystals of aluminum titanate, in which MgO and $SiO_2$ are dissolved to form a solid solution, and glass phases, the glass phases containing 40-80% by mass of $SiO_2$ and 1-20% by mass of MgO, the average size of the glass phases being 30 μm or less in a cross section of the cell walls, and the mass ratio of the glass phases to the total of the main crystals of aluminum titanate and the glass phases being 1% or more by mass and less than 10% by mass.

With respect to the requirements that the cell walls comprise at least main crystals of aluminum titanate, in which MgO and $SiO_2$ are dissolved to form a solid solution, and glass phases, that the glass phases contain 40-80% by mass of $SiO_2$ and 1-20% by mass of MgO, and that the average size of the glass phases is 30 μm or less in a cross section of the cell walls, the second aluminum-titanate-based ceramic honeycomb structure is the same as the first one. Accordingly, their explanation will be omitted, and only the mass ratio of the glass phases will be explained below.

The mass ratio of the glass phases to the total of main crystals of aluminum titanate, in which MgO and $SiO_2$ are dissolved to form a solid solution, and glass phases is 1% or more by mass and less than 10% by mass. When the mass ratio of the glass phases is less than 1% by mass, aluminum titanate crystals are not bonded strongly, making microcracks insufficiently fine, and thus failing to improve the strength of the honeycomb structure. When the mass ratio of glass phases is 10% or more by mass, the glass phases have large influence, providing the honeycomb structure with small strength and a large thermal expansion coefficient. The mass ratio of the glass phases is preferably 1% or more by mass and less than 5% by mass.

(3) Porous Structure

As described in the section of prior art, it is difficult to provide conventional aluminum titanate with a low thermal expansion coefficient and high strength. Accordingly, it is difficult to obtain a low-pressure-loss honeycomb structure by adjusting porosity, pore distribution, etc., because of insufficient strength. On the other hand, the honeycomb structure of the present invention has fine microcracks because of particular glass phases, thereby having high strength while keeping low thermal expansion inherent in aluminum titanate ceramics, and further has better pressure loss characteristics than those of conventional ones by optimizing the porosity or pore distribution of cell walls.

Figure 3:
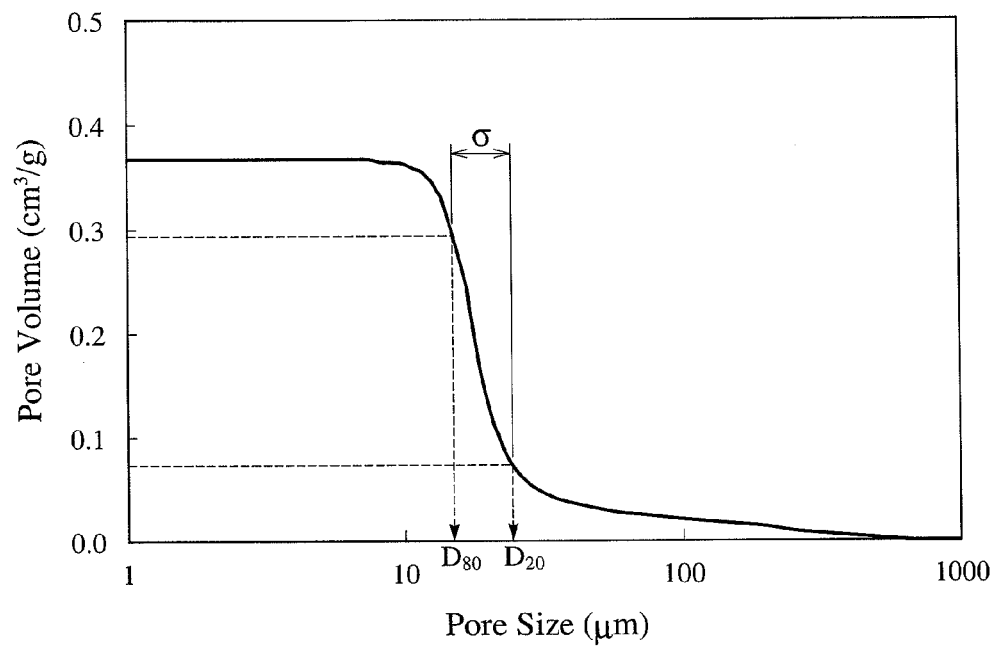
FIG. 3 is a graph showing the relation between pore size and pore volume in the cell walls of the honeycomb structure produced in Example 3.

The aluminum-titanate-based honeycomb structure of the present invention preferably has porosity of 40-70%, an average pore size of 10-40 μm, and a pore distribution deviation σ of 0.4 or less. With such a structure, the honeycomb structure is provided with low pressure loss. Here, $\sigma = \log(D20) - \log(D80)$, wherein D20 represents a pore size (μm) at a pore volume corresponding to 20% of the total pore volume, and D80 represents a pore size (μm) at a pore volume corresponding to 80% of the total pore volume, both in a curve representing the relation between the pore size and the cumulative pore volume (pore volume accumulated in a range from the maximum pore size to a particular pore size), as shown in FIG. 3. D80<D20. The relation between the pore size and the cumulative pore volume can be determined by mercury porosimetry.

When the porosity is less than 40%, sufficiently low pressure loss may not be achieved. When the porosity exceeds 70%, practically sufficient strength may not be obtained. The more preferred porosity is 45-64%.

When the average pore size is less than 10 μm, sufficiently low pressure loss may not be achieved. When the average pore size exceeds 40 μm, the particulate-matter-capturing capability may be lowered. The more preferred average pore size is 15-30 μm.

The aluminum-titanate-based honeycomb structure of the present invention preferably has air permeability of $2 \times 10^{-12}$ $m^2$ or more. The air permeability is an index indicating how easily air can pass through porous cell walls. The air permeability of $2 \times 10^{-12}$ $m^2$ or more provides the honeycomb structure with low pressure loss.

The pore distribution deviation σ is the difference between the logarithm of D20 and the logarithm of D80 as described above, indicating the pore size distribution. Smaller 6 means a sharper pore size distribution. With the porosity of 40-70%, the average pore size of 10-40 μm and σ of 0.4 or less, there are many pores contributing to low pressure loss, and there are few micro-pores deteriorating pressure loss and few coarse pores lowering the strength, thereby providing the honeycomb structure with low pressure loss and high strength. When the pore distribution deviation σ is more than 0.4, there are a higher percentage of pores deteriorating pressure loss and strength, failing to obtain a honeycomb structure with low pressure loss and high strength. The pore distribution deviation σ is more preferably 0.35 or less, most preferably 0.3 or less.

(4) Shape

To provide the honeycomb structure with both low pressure loss and high strength, its cell walls preferably have thickness of 0.1-0.5 mm and a cell pitch of 1-3 mm. The cross section shape of each flow path in the honeycomb structure in a transverse direction is not particularly restricted, but it is preferably triangular, tetragonal, hexagonal or circular from the aspect of production, particularly tetragonal from the aspect of strength and filter area. The cell walls preferably have linearly extending flat surfaces, but may have curved surfaces as long as they do not give large resistance to an exhaust gas passing through the flow paths.

(5) Properties

The main crystals of aluminum titanate, in which MgO and $SiO_2$ are dissolved to form a solid solution, improve the thermal stability of the aluminum-titanate-based ceramic honeycomb structure of the present invention at 800-1250° C. Further, the glass phases containing MgO and $SiO_2$ introduce a large number of fine microcracks into the cell walls, providing the honeycomb structure with a small thermal expansion coefficient, improved heat shock resistance and high strength. Specifically, the honeycomb structure can have A-axis compression strength of 4 MPa or more, a thermal expansion coefficient of $12 \times 10^{-7}/°C$. or less, preferably $10 \times 10^{-7}/°C$. or less. Accordingly, even when communicating pores are introduced into the cell walls to have low pressure loss, thereby having as high porosity as 40-70%, the honeycomb structure can have practically sufficient strength.

With MgO and $SiO_2$ dissolved in aluminum titanate, as described above, the decomposition of aluminum titanate to rutile and corundum is effectively prevented when the honeycomb structure is exposed to 800-1250° C. for a long period of time, having 95% or more of aluminum titanate remain when kept at 1100° C. in an atmosphere for 100 hours.

(6) Honeycomb Filter

Figure 1A:
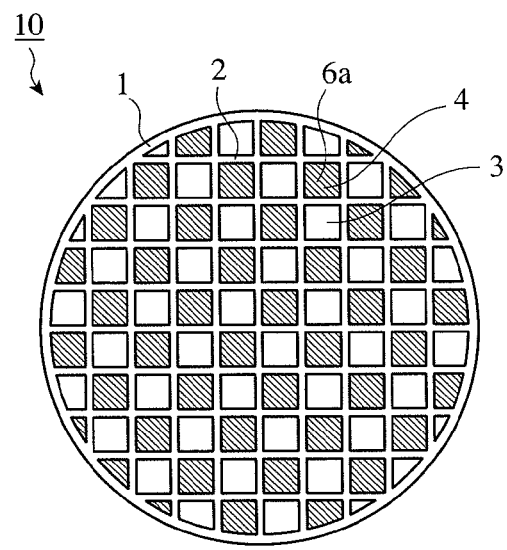
FIG. 1(a) is a schematic cross-sectional view showing one example of honeycomb filters perpendicularly to flow paths.
Figure 1B:
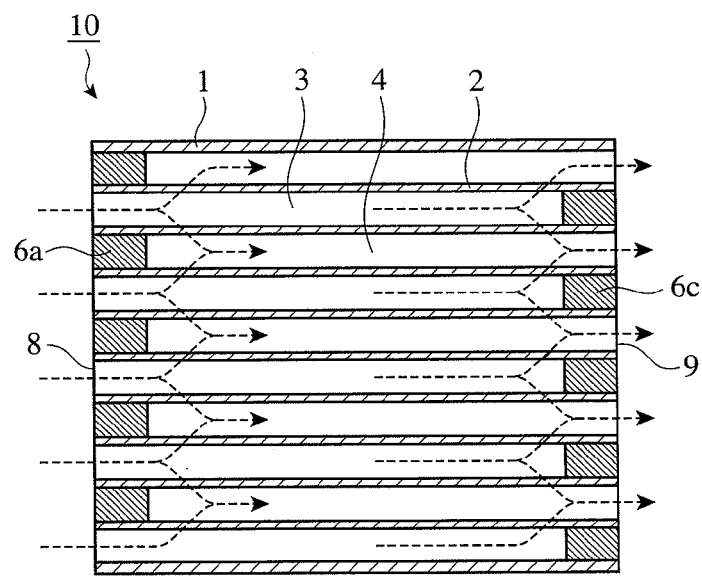
FIG. 1(b) is a schematic cross-sectional view showing one example of honeycomb filters in parallel to flow paths.
Figure 4:
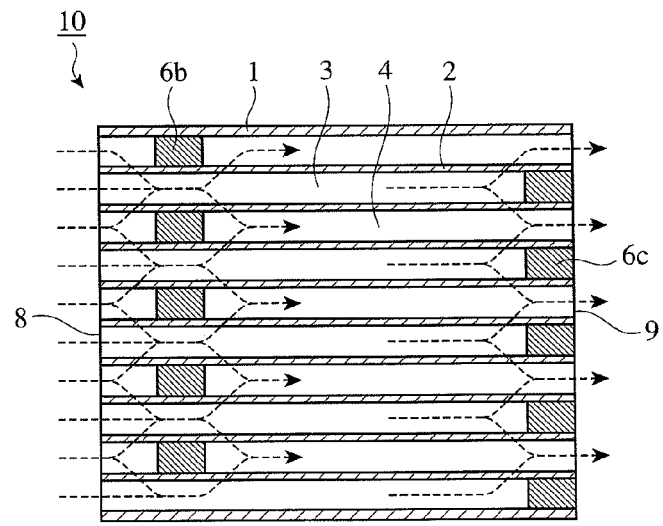
FIG. 4 is a schematic cross-sectional view showing another example of honeycomb filters in parallel to flow paths.

As shown in FIGS. 1(a) and 1(b), a honeycomb filter 10 is obtained by alternately sealing the exhaust-gas-inlet-side end surface 8 and exhaust-gas-outlet-side end surface 9 of the outlet-side-sealed flow paths 3 and the inlet-side-sealed flow paths 4 of the honeycomb structure in a checkerboard pattern. Plugs 6a, 6c for forming the outlet-side-sealed flow paths 3 and the inlet-side-sealed flow paths 4 are not necessarily disposed at end surfaces 8, 9 of the flow paths, but may be disposed in portions of flow paths inside from the end surfaces. As shown in FIG. 4, more preferable is the formation of plugs 6b inside the inlet-side-sealed flow paths 4 on the exhaust gas inlet side from the aspect of the performance of cleaning an exhaust gas while capturing particulate matter. The honeycomb structure shown in FIG. 4 can capture more particulate matter in wider areas upstream of the inlet-side plugs 6b and the outlet-side plugs 6c, than the conventional honeycomb structure shown in FIGS. 1(a) and 1(b) having plugs at both ends, and can capture more particulate matter at the melt-down limit because main crystals in the cell walls are made of heat-resistant aluminum titanate, in which MgO and $SiO_2$ are dissolved to form a solid solution, resulting in longer combustion intervals, and drastic improvement in the fuel efficiency of diesel engines. The outlet-side-sealed flow paths 3 and the inlet-side-sealed flow paths 4 may have the same or different opening areas.

[2] Production Method

The aluminum-titanate-based ceramic honeycomb structure of the present invention comprising at least main crystals of aluminum titanate, in which MgO and $SiO_2$ are dissolved to form a solid solution, and glass phases can be produced by mixing 100 parts by mass of a powder material comprising alumina powder containing 0.05-0.5% by mass of $Na_2O$ and titania powder containing 0.5% or less by mass of $Na_2O$ at a molar ratio of 47/53 to 53/47, with at least 1-6 parts by mass of silica powder and 0.5-5 parts by mass of magnesia source powder having an average particle size of 5 µm or less, molding the resultant material to a honeycomb structure, and sintering the resultant molding by heating it at an average speed of 10° C./hr to 100° C./hr in a temperature range of 1300° C. to 1350° C. and keeping it at the highest keeping temperature of 1400-1650° C.

(1) Starting Material Powder

The starting material powder comprises 100 parts by mass of a powder material comprising alumina powder containing 0.05-0.5% by mass of $Na_2O$ and titania powder containing 0.5% or less by mass of $Na_2O$ at a molar ratio of 47/53 to 53/47, and at least 1-6 parts by mass of silica powder and 0.5-5 parts by mass of magnesia source powder having an average particle size of 5 µm or less.

With the alumina powder and the titania powder in a molar ratio range of 47/53 to 53/47, the amounts of titania and alumina remaining after the synthesis of aluminum titanate by sintering are reduced, so that the honeycomb structure can have heat resistance inherent in aluminum titanate. The molar ratio of titania powder to alumina powder is preferably 48/52 to 52/48.

The alumina powder preferably has an average particle size of 0.2-10 µm. The average particle size of less than 0.2 µm may densify aluminum-titanate-based ceramics with a smaller number of pores, needing a large amount of pore-forming materials to obtain porous bodies having desired porosity, average pore size, pore distribution deviation and air permeability, and resulting in insufficiently low pressure loss. When the average particle size exceeds 10 µm, the synthesis of aluminum titanate becomes insufficient, so that alumina having a large thermal expansion coefficient remains, failing to obtain a low thermal expansion coefficient. The alumina powder more preferably has an average particle size of 2-8 µm. Although small-particle-size alumina powder is conventionally used to produce aluminum titanate from alumina powder and titania powder, the use of alumina powder having an average particle size of 2-8 µm can suppress sintering shrinkage and permit pores to remain, thereby easily providing porous bodies with desired porosity, average pore size, pore distribution deviation and air permeability. The alumina powder most preferably has an average particle size of 2-6 µm. The alumina powder preferably contains 50% or more by mass of powder having a particle size of 2-20 µm, and 5-30% by mass of powder having a particle size of 20 µm or more. The average particle size of powder is measured by a laser diffraction method.

The titania powder preferably has an average particle size of 0.05-3 µm. When the average particle size is less than 0.05 µm, a large amount of water is needed to prepare a starting material, making cracking likely in a drying step. When the average particle size is more than 3 µm, the synthesis of aluminum titanate is insufficient. The titania powder more preferably has an average particle size of 0.1-2 µm. The titania powder preferably has purity of 98% or more. The crystal type of the titania powder may be anatase or rutile.

The alumina powder preferably has a larger average particle size than that of the titania powder. The use of large alumina powder and small titania powder provides a high-porosity structure with reduced sintering shrinkage, thereby preventing sintering cracking even for as large honeycomb structures as, for instance, 150 mm or more in outer diameter and 150 mm in length.

With 0.05-0.5% by mass of $Na_2O$ contained in alumina powder and 0.5% or less by mass of $Na_2O$ contained in titania powder, a low-melting-point liquid phase can be generated mainly from silica powder and magnesia source powder in a sintering process, and sintering bonds main crystals of aluminum titanate with fine glass phases, resulting in finer microcracks, a smaller thermal expansion coefficient and improved strength. $Na_2O$ contained in the alumina powder is preferably 0.1-0.3% by mass, and $Na_2O$ contained in the titania powder is preferably 0.01-0.3% by mass.

With 1-6 parts by mass of silica powder added per 100 parts by mass of the total of the titania powder and the alumina powder, the amount of $SiO_2$ dissolved in main crystals of aluminum titanate can be 0.1-1.5%, and the area ratio of the glass phases to the total area of main crystals of aluminum titanate and glass phases can be 2-12%, and/or the mass ratio of glass phases per the total of main crystals of aluminum titanate and glass phases can be 1% or more by mass and less than 10% by mass, both in a cross section of the sintered cell walls. The amount of the silica powder is more preferably 2-4 parts by mass.

The silica powder preferably has an average particle size of 0.1-30 μm. When the average particle size is more than 30 μm, the melting speed of silica is too slow to generate a liquid phase during sintering, making fine microcracks less likely. In addition, when a plasticized moldable material passes through a die slit as narrow as, for instance, about 0.3 mm during extrusion, the die slit is clogged with silica powder, resulting in a ceramic honeycomb structure with cracked cell walls. When the average particle size is less than 0.1 μm, the silica powder has a large specific surface area, needing much water in preparing a starting material, and thus resulting in less self-supportable moldings and cracking in cell walls while drying. The silica powder more preferably has an average particle size of 1-25 μm. The silica may be quartz, and amorphous silica such as fused silica and colloidal silica, and amorphous silica obtained by completely fusing high-purity silica stones at high temperatures is particularly preferable. As long as it is amorphous, amorphous silica may be pulverized powder or spherical powder. The purity of the silica powder is preferably 99% or more, more preferably 99.5% or more. When silicon-containing minerals such as feldspar are used, the amount of $SiO_2$ dissolved in main crystals of aluminum titanate and the composition of glass phases cannot be controlled within the range of the present invention. Accordingly, silica powder is used in the present invention.

With 0.5-5 parts by mass of magnesia source powder having an average particle size of 5 μm or less added to 100 parts by mass of the total of titania powder and alumina powder, the amount of MgO dissolved in main crystals of aluminum titanate can be 0.2-5%, and the amount of MgO contained in glass phases can be 1-20%, resulting in a honeycomb structure with improved thermal stability at 800-1250° C., a small thermal expansion coefficient and improved strength. The average particle size of more than 5 μm provides the magnesia source powder with reduced reactivity with the silica powder, resulting in less than 1% of MgO contained in glass phases, and failing to provide the glass phases with a low melting point, and thus failing to provide a honeycomb structure with a small thermal expansion coefficient and high strength. The average particle size of the magnesia source powder is preferably 0.2-4 μm, more preferably 0.2-2 μm. The amount of the magnesia source powder is more preferably 0.5-2 parts by mass. The magnesia source may be magnesium oxide, magnesium hydroxide, magnesium carbonate, talc, spinel, etc., and magnesium oxide is preferable from the aspect of generating a liquid phase from alumina powder, titania powder and silica powder in a sintering process.

(2) Sintering Conditions

In the sintering of a honeycomb structure molding, heating is conducted at an average speed of 10° C./hr to 100° C./hr in a temperature range of 1300° C. to 1350° C. When ceramic products, particularly large honeycomb structures of 150 mm or more in outer diameter and 150 mm or more in length, are sintered, the temperature-elevating speed is preferably as low as possible to keep the temperature uniformity in a sintering process. In the method of the present invention, however, the temperature elevation speed is as high as 10° C./hr to 100° C./hr in a temperature range of 1300° C. to 1350° C., as a sintering condition for large honeycomb structures of 150 mm or more in outer diameter and 150 mm or more in length, making microcracks finer. Though this reason is not clear, it is considered that because in this temperature range, silica powder and magnesia source powder having an average particle size of 5 μm or less form a liquid phase, while alumina powder and titania powder synthesize aluminum titanate crystals, in which MgO and $SiO_2$ are dissolved to form a solid solution, main crystals of aluminum titanate are bonded with fine glass phases after sintering, resulting in finer microcracks. The average temperature-elevating speed is more preferably 30° C./hr to 80° C./hr, most preferably 50 to 80° C./hr. Although the temperature may be elevated at 10° C./hr to 100° C./hr in a wider temperature range than 1300-1350° C., its range should be restricted to 1250-1400° C. The temperature-elevating speed in other temperature ranges may be properly determined in a range not generating sintering cracking in the honeycomb structure, but it should be lower than the temperature-elevating speed in the above temperature range.

The sintering is conducted at 1400-1650° C. The synthesis of aluminum titanate from alumina powder and titania powder is insufficient at temperatures lower than 1400° C., resulting in a large thermal expansion coefficient. At temperatures higher than 1650° C., densification progresses when a pore-forming material described below is added, resulting in cell walls with low porosity and thus large pressure loss. It is also disadvantageous in a sintering cost. The more preferred sintering temperature is 1500-1600° C.

A time period in which the molding is kept at the highest temperature of 1400-1650° C. during sintering is preferably 24 hours or longer. The highest-temperature-keeping time of 24 hours or longer makes fine pores disappear, and the pore-forming material added acts to increase the average pore size, resulting in the honeycomb structure with large air permeability and low pressure loss.

(3) Pore-Forming Materials

A starting material comprising alumina powder, titania powder, silica powder and magnesia source powder is preferably mixed with a pore-forming material. The addition of the pore-forming material provides the desired porosity, average pore size and air permeability. As the pore-forming material, flour, graphite, starch, cellulose, ceramic balloons, polyethylene, polystyrene, polypropylene, nylon, polyesters, acrylic resins, phenol resins, epoxy resins, ethylene-vinyl acetate copolymers, styrene-butadiene block copolymers, styrene-isoprene block copolymers, polymethyl methacrylate, methylmethacrylate-acrylonitrile copolymers, urethanes, waxes, etc. may be used alone or in combination, and among them, resin foams made of methylmethacrylate-acrylonitrile copolymers are preferable.

The present invention will be explained in further detail by Examples below without intention of restricting the present invention thereto.

Example 1

The rutile-type titania powder A and the alumina powder D shown in Table 1 were weighed at a molar ratio of 50/50

(corresponding to a mass ratio of 43.9/56.1) (see Table 2), and 100 parts by mass of them were mixed with 3 parts by mass of amorphous silica powder A (see Table 1), 1.0 parts by mass of magnesia powder C (see Table 1), 14 parts by mass of isobutane-containing resin foams, and 6 parts by mass of methyl cellulose, and blended with water to form a plasticized moldable material. This plasticized moldable material was extruded to form a molding having a honeycomb structure. This molding was dried, and heated in the air in a gas furnace for 150 hours from room temperature to 1000° C., at 10° C./h from 1000° C. to 1300° C., at 32° C./hr from 1300° C. to 1350° C., and at a 10° C./h from 1350° C. to 1600° C., and kept at 1600° C. for 5 hours for sintering, thereby obtaining a honeycomb structure of 152 mm in outer diameter, 152 mm in length, 0.25 mm in cell wall thickness and 1.4 mm in cell wall pitch, which had aluminum titanate as main crystals.

Test pieces were cut out of this honeycomb structure to evaluate crystal phases constituting the honeycomb structure, the amounts of $SiO_2$ and MgO dissolved in main aluminum titanate crystals, the composition, average size, area ratio and mass ratio of glass phases, and the porosity, average pore size and pore distribution deviation σ of cell walls, air permeability, A-axis compression strength, thermal expansion coefficient (CTE), and thermal stability at 1100° C.

The crystal phases constituting the honeycomb structure were identified by pulverizing the above test piece, measuring the X-ray diffraction pattern of the resultant powder sample by an X-ray diffractometer (RINT1500 available from Rigaku Corporation), and comparing it with the data of the JCPDS file. The percentage of the crystal phases were calculated from the ratios of the (230) plane diffraction intensity ($I_{AT(230)}$) of aluminum titanate, the (104) plane diffraction intensity ($I_{corundum(104)}$) of corundum $Al_2O_3$, the (110) plane diffraction intensity ($I_{rutile(110)}$) of rutile $TiO_2$, and the (311) plane diffraction intensity ($I_{spinel(311)}$) of spinel.

The amounts of $SiO_2$ and MgO dissolved in main crystals of aluminum titanate were determined by analyzing a ground cell wall cross section of the sintered honeycomb structure embedded in a resin by EPMA (EPMA-1610 available from Shimadzu Corporation), and comparing the X-ray strengths of Si and Mg in main crystals of aluminum titanate with the already prepared calibration curve.

The composition, average size and area ratio of glass phases were determined by observing a ground cell wall cross section of the sintered honeycomb structure embedded in a resin by FE-SEM (S-4000 available from Hitachi, Ltd.). The composition of glass phases was measured by an EDX analyzer, and the average size and area ratio (the ratio of the areas of glass phases to the total area of aluminum titanate crystals and glass phases) of glass phases were calculated by image analysis software (Image-Pro Plus available from Media Cybernetics) on a SEM photograph showing the cross section of cell walls. The glass phases existed between crystal phases of aluminum titanate, and their maximum lengths were regarded as their sizes. The average size of glass phases was determined by measuring the sizes of 20 glass phases and averaging them.

The mass ratio (% by mass) a of glass phases was calculated by the formula of a=100×(d−b)/(c−b), wherein b represents the amount (% by mass) of $SiO_2$ dissolved in main aluminum titanate crystals, and c represents the amount (% by mass) of $SiO_2$ in the glass phases, both measured as described above, and d represents the amount (% by mass) of $SiO_2$ in the starting material.

The porosity, average pore size and pore distribution deviation σ[=log(D20)−log(D80)] of cell walls of the honeycomb structure were measured by mercury porosimetry. A test piece (10 mm×10 mm×10 mm) cut out of the honeycomb structure was put in a measurement cell of Autopore III available from Micromeritics, and the measurement cell was evacuated and pressurized by introducing mercury. From the relation of the pressure and the volume of mercury intruded into pores in the test piece, the relation of a pore size and a cumulative pore volume was determined. The mercury-introducing pressure was 0.5 psi (0.35×10$^{-3}$ kgf/mm$^2$), and the pore size was calculated from the pressure using a contact angle of 130°, and a surface tension of 484 dyne/cm.

The air permeability of cell walls in the honeycomb structure was measured by a known method on a disc-shaped test piece of 20 mm in outer diameter cut out of the cell walls of the sintered honeycomb structure, using a perm porometer (CFP-1100 available from Porous Materials Inc.).

The A-axis compression strength was measured according to "Method Of Testing Monolith Ceramic Carriers For Cleaning Exhaust Gases From Automobiles," Standard M505-87 of JASO.

The average thermal expansion coefficient (CTE) between 35° C. and 800° C. was determined on a test piece having a cross section of 4.8 mm×4.8 mm and a length of 50 mm, which was cut out of the honeycomb structure such that its longitudinal direction was substantially aligned with the direction of flow paths, by measuring increase in the longitudinal length of the test piece while heating it from 35° C. to 800° C. at a temperature-elevating speed of 10° C./minute under a constant load of 20 g in a compression load/differential expansion-type thermomechanical analyzer (TMA, ThermoPlus available from Rigaku Corporation), and averaging it.

The stability at 1100° C. was evaluated on a test piece of 10 mm×10 mm×10 mm by measuring the ratio of aluminum titanate remaining after a heat treatment at 1100° C. for 100 hours in an air-atmosphere electric furnace. The ratio (X) of the remaining aluminum titanate was determined on the test piece before and after the above heat treatment, by the formula of X=[(R after heat treatment)/(R before heat treatment)]×100(%), wherein R is the ratio of aluminum titanate represented by [$I_{AT(230)}$/($I_{TiO2(110)}$+$I_{AT(230)}$)], wherein $I_{AT(230)}$ is the X-ray diffraction intensity of a (230) plane of aluminum titanate, and $I_{TiO2(110)}$ is the X-ray diffraction intensity of a (110) plane of rutile $TiO_2$.

It was confirmed from X-ray diffraction measurement results that the honeycomb structure of Example 1 contained aluminum titanate as main crystals, and slightly corundum. It was further confirmed from EPMA analysis and SEM observation that the honeycomb structure had glass phases containing MgO and $SiO_2$, together with main crystals of aluminum titanate in which $SiO_2$ and MgO were dissolved. The amounts of $SiO_2$ and MgO dissolved in the main crystals, the composition, average size, area ratio and mass ratio of the glass phases, the porosity, average pore size and pore distribution deviation σ of cell walls, and the air permeability, A-axis compression strength, thermal expansion coefficient and thermal stability at 1100° C. are shown in Table 3.

Examples 2-14 and Comparative Examples 1-6

The honeycomb structures of Examples 2-14 and Comparative Examples 1-6 were produced in the same manner as in Example 1 except for changing the types, formulations and sintering conditions of powders used as shown in Table 2. Specifically, the following changes were made.

The honeycomb structure of Example 2 was produced in the same manner as in Example 1 except for using magnesium hydroxide as a magnesia source powder, and changing the amount of resin foams added.

The honeycomb structure of Example 3 was produced in the same manner as in Example 1 except for changing the sintering temperature.

The honeycomb structure of Example 4 was produced in the same manner as in Example 1 except for changing the amounts of silica powder and resin foams, and the temperature-elevating speed and the highest keeping temperature during sintering.

The honeycomb structure of Example 5 was produced in the same manner as in Example 1, except for changing the mass ratio of rutile-type titania powder A to alumina powder D to 42.9/57.1 (49/51 by a molar ratio), the type of silica powder, the amount of magnesia powder, and the temperature-elevating speed during sintering.

The honeycomb structure of Example 6 was produced in the same manner as in Example 1 except for changing the amount of magnesia powder.

The honeycomb structure of Example 7 was produced in the same manner as in Example 1, except for changing the type and amount of magnesia powder and the sintering temperature.

The honeycomb structure of Example 8 was produced in the same manner as in Example 1 except for changing the amount of magnesia powder.

The honeycomb structure of Example 9 was produced in the same manner as in Example 1 except for changing the amount of magnesia and the sintering temperature.

The honeycomb structure of Example 10 was produced in the same manner as in Example 1, except for changing the type of alumina powder and the sintering temperature and time.

The honeycomb structure of Example 11 was produced in the same manner as in Example 1, except for changing the types of alumina powder and silica powder, and the sintering temperature and time.

The honeycomb structure of Example 12 was produced in the same manner as in Example 1, except for using rutile-type titania powder A and alumina powder C, changing their mass ratio to 44.9/55.1 (51/49 by a molar ratio), the amount of silica powder, the type of magnesia powder, the temperature-elevating speed during sintering, and the sintering temperature and time.

The honeycomb structure of Example 13 was produced in the same manner as in Example 12, except for changing the type of titania powder, the amount of silica powder, and the temperature-elevating speed during sintering.

The honeycomb structure of Example 14 was produced in the same manner as in Example 13 except for changing the amount of silica powder and the temperature-elevating speed during sintering.

The honeycomb structures of Comparative Examples 1 and 2 were produced in the same manner as in Example 1, except for using rutile-type titania powder A and alumina powder C, and changing their mass ratio to 44.9/55.1 (51/49 by a molar ratio), the amount of silica powder, the type of magnesia powder, and the sintering temperature and time.

The honeycomb structure of Comparative Example 3 was produced in the same manner as in Example 1, except for changing the type of magnesia powder, the temperature-elevating speed during sintering, and the sintering temperature and time.

The honeycomb structure of Comparative Example 4 was produced in the same manner as in Example 1, except for using rutile-type titania powder A and alumina powder E, and changing their mass ratio to 41/59 (47/53 by a molar ratio), the type and amount of magnesia powder, the amount of resin foams, and the sintering temperature and time.

The honeycomb structure of Comparative Example 5 was produced in the same manner as in Comparative Example 4, except for changing the types of titania powder and alumina powder, the type and amount of magnesia powder, and the sintering temperature and time.

The honeycomb structure of Comparative Example 6 was produced in the same manner as in Example 1 except for adding no magnesia powder.

With respect to the resultant honeycomb structures of Examples 2-14 and Comparative Examples 1-6, crystal phases constituting them, the amounts of $SiO_2$ and $MgO$ dissolved in main aluminum titanate crystals, the composition, average size, area ratio and mass ratio of glass phases, the porosity, average pore size and pore distribution deviation σ of cell walls, and their air permeability, A-axis compression strength, thermal expansion coefficients (CTEs), and thermal stability at 1100° C. were evaluated in the same manner as in Example 1.

It was confirmed that the honeycomb structures of Examples 2-14 and Comparative Examples 1-6 contained main crystals of aluminum titanate in which $SiO_2$ and $MgO$ are dissolved to form a solid solution, and glass phases containing $MgO$ and $SiO_2$ like that of Example 1.

TABLE 1

| Item | Average Particle Size (μm) | Ig. Loss (%) | Chemical Composition (% by mass) | | | | | |
|---|---|---|---|---|---|---|---|---|
| | | | $Al_2O_3$ | $TiO_2$ | $SiO_2$ | $MgO$ | $Na_2O$ | $K_2O$ |
| Titania A (Rutile-Type) | 1.6 | 0.1 | 0.01 | 99.4 | — | 0.11 | 0.022 | 0.08 |
| Rutile Titania B (Rutile-Type) | 0.8 | 0.1 | 0.01 | 99.5 | — | 0.1 | 0.031 | 0.07 |
| Alumina A[1] | 0.5 | 0.1 | 99.9 | — | 0.04 | — | 0.03 | — |
| Alumina B[2] | 1 | 0.1 | 99.8 | — | 0.03 | — | 0.26 | — |
| Alumina C[3] | 3 | 0.1 | 99.8 | — | 0.02 | — | 0.21 | — |
| Alumina D[4] | 5 | 0.05 | 99.7 | — | 0.02 | — | 0.25 | — |
| Alumina E[5] | 13 | 0.1 | 99.8 | — | 0.02 | — | 0.32 | — |
| Silica A (Amorphous) | 20.1 | 0.1 | 0.08 | — | ≥99.5 | — | 0.0027 | 0.002 |
| Silica B (Amorphous) | 1.8 | 0.1 | 0.13 | — | ≥99.5 | — | 0.0013 | — |
| Silica C (Amorphous) | 0.8 | 0.1 | 0.12 | — | ≥99.5 | — | 0.0012 | — |

TABLE 1-continued

| Item | Average Particle Size (μm) | Ig. Loss (%) | Chemical Composition (% by mass) | | | | | |
|---|---|---|---|---|---|---|---|---|
| | | | Al$_2$O$_3$ | TiO$_2$ | SiO$_2$ | MgO | Na$_2$O | K$_2$O |
| Magnesia A | 0.5 | 0.1 | — | — | — | 99.9 | 0.02 | — |
| Magnesia B | 0.8 | 0.1 | — | — | — | 99.8 | 0.01 | — |
| Magnesia C | 1.3 | 0.1 | — | — | — | 99.9 | 0.01 | — |
| Magnesia D | 2 | 0.1 | — | — | — | 99.98 | 0.014 | — |
| Magnesia E | 5.1 | 0.1 | — | — | — | 99.8 | 0.01 | — |
| Magnesium Hydroxide | 1.3 | 30.9 | — | — | — | 69 | 0.01 | — |

Note:
(1) Alumina A contained 5% by mass of particles of 2-10 μm.
(2) Alumina B contained 12% by mass of particles of 2-10 μm.
(3) Alumina C contained 54% by mass of particles of 2-10 μm, and 2% by mass of particles of 20 μm or more.
(4) Alumina D contained 66% by mass of particles of 2-10 μm, and 7% by mass of particles of 20 μm or more.
(5) Alumina E contained 40% by mass of particles of 2-10 μm, and 20% by mass of particles of 20 μm or more.

TABLE 2

| | Formulation (parts by mass) | | | | | | | | | |
|---|---|---|---|---|---|---|---|---|---|---|
| | Titania | | Alumina | | | | | Silica | | |
| No. | A | B | A | B | C | D | E | A | B | C |
| Example 1 | 43.9 | — | — | — | — | 56.1 | — | 3.0 | — | — |
| Example 2 | 43.9 | — | — | — | — | 56.1 | — | 3.0 | — | — |
| Example 3 | 43.9 | — | — | — | — | 56.1 | — | 3.0 | — | — |
| Example 4 | 43.9 | — | — | — | — | 56.1 | — | — | 3.0 | — |
| Example 5 | 42.9 | — | — | — | — | 57.1 | — | — | 3.0 | — |
| Example 6 | 43.9 | — | — | — | — | 56.1 | — | 3.0 | — | — |
| Example 7 | 43.9 | — | — | — | — | 56.1 | — | 3.0 | — | — |
| Example 8 | 43.9 | — | — | — | — | 56.1 | — | 3.0 | — | — |
| Example 9 | 43.9 | — | — | — | — | 56.1 | — | 3.0 | — | — |
| Example 10 | 43.9 | — | — | 56.1 | — | — | — | 3.0 | — | — |
| Example 11 | 43.9 | — | — | 56.1 | — | — | — | — | — | 3.0 |
| Example 12 | 44.9 | — | — | — | 55.1 | — | — | 1.0 | — | — |
| Example 13 | — | 44.9 | — | — | 55.1 | — | — | 4.0 | — | — |
| Example 14 | — | 44.9 | — | — | 55.1 | — | — | 5.0 | — | — |
| Comparative Example 1 | 44.9 | — | — | — | 55.1 | — | — | 0.5 | — | — |
| Comparative Example 2 | 44.9 | — | — | — | 55.1 | — | — | 8.0 | — | — |
| Comparative Example 3 | 43.9 | — | — | — | — | 56.1 | — | 3.0 | — | — |
| Comparative Example 4 | 41.0 | — | — | — | — | — | 59.0 | 3.0 | — | — |
| Comparative Example 5 | — | 41.0 | 59.0 | — | — | — | — | 3.0 | — | — |
| Comparative Example 6 | 43.9 | — | — | — | — | 56.1 | — | 3.0 | — | — |

| | Formulation (parts by mass) | | | | | | |
|---|---|---|---|---|---|---|---|
| | Magnesia | | | | | Magnesium Hydroxide | Resin Foams |
| No. | A | B | C | D | E | | |
| Example 1 | — | — | 1.0 | — | — | — | 14 |
| Example 2 | — | — | — | — | — | 1.44 | 12 |
| Example 3 | — | — | 1.0 | — | — | — | 14 |
| Example 4 | — | — | 1.0 | — | — | — | 12 |
| Example 5 | — | — | 0.5 | — | — | — | 14 |
| Example 6 | — | — | 3.0 | — | — | — | 14 |
| Example 7 | — | — | — | 3.0 | — | — | 14 |
| Example 8 | — | — | 5.0 | — | — | — | 14 |
| Example 9 | — | — | 5.0 | — | — | — | 14 |
| Example 10 | — | — | 1.0 | — | — | — | 14 |
| Example 11 | — | — | 1.0 | — | — | — | 14 |
| Example 12 | — | 1.0 | — | — | — | — | 14 |
| Example 13 | — | 1.0 | — | — | — | — | 14 |
| Example 14 | — | 1.0 | — | — | — | — | 14 |
| Comparative Example 1 | — | 1.0 | — | — | — | — | 14 |

TABLE 2-continued

| No. | | | | | | | |
|---|---|---|---|---|---|---|---|
| Comparative Example 2 | — | 1.0 | — | — | — | — | 14 |
| Comparative Example 3 | — | — | — | 1.0 | — | — | 14 |
| Comparative Example 4 | — | — | — | — | 0.3 | — | 13 |
| Comparative Example 5 | 7.0 | — | — | — | — | — | 13 |
| Comparative Example 6 | — | — | — | — | — | — | 14 |

| | Sintering Conditions | | | | |
|---|---|---|---|---|---|
| | Temperature-Elevating Speed (° C./h) | | | $T_h^{(1)}$ | Keeping |
| No. | 1000-1300° C. | 1300-1350° C. | 1350° C. to $T_h^{(1)}$ | (° C.) | Time (hr) |
| Example 1 | 10 | 32 | 10 | 1600 | 5 |
| Example 2 | 10 | 32 | 10 | 1600 | 5 |
| Example 3 | 10 | 32 | 10 | 1500 | 5 |
| Example 4 | 20 | 32 | 20 | 1500 | 5 |
| Example 5 | 20 | 32 | 20 | 1600 | 5 |
| Example 6 | 10 | 32 | 10 | 1600 | 5 |
| Example 7 | 10 | 32 | 10 | 1500 | 5 |
| Example 8 | 10 | 32 | 10 | 1600 | 5 |
| Example 9 | 10 | 32 | 10 | 1500 | 5 |
| Example 10 | 10 | 32 | 10 | 1460 | 10 |
| Example 11 | 10 | 32 | 10 | 1430 | 10 |
| Example 12 | 10 | 20 | 10 | 1550 | 24 |
| Example 13 | 20 | 50 | 20 | 1550 | 24 |
| Example 14 | 20 | 60 | 20 | 1550 | 24 |
| Comparative Example 1 | 10 | 32 | 10 | 1550 | 10 |
| Comparative Example 2 | 10 | 32 | 10 | 1550 | 10 |
| Comparative Example 3 | 10 | 10 | 10 | 1660 | 10 |
| Comparative Example 4 | 10 | 32 | 10 | 1450 | 10 |
| Comparative Example 5 | 10 | 32 | 10 | 1650 | 10 |
| Comparative Example 6 | 10 | 32 | 10 | 1600 | 5 |

Note:
$^{(1)}T_h$ means the highest temperature.

TABLE 3

| | Crystal Phases (%) Other Than Main Crystals | | Amount (% by mass) In Main Crystal Phases | |
|---|---|---|---|---|
| No. | Corundum | Spinel | Rutile | SiO$_2$ | MgO |
| Example 1 | 2 | 0 | 0 | 0.50 | 0.80 |
| Example 2 | 1 | 0 | 0 | 0.49 | 0.78 |
| Example 3 | 3 | 0 | 0 | 0.28 | 0.81 |
| Example 4 | 2 | 0 | 0 | 0.30 | 0.78 |
| Example 5 | 1 | 0 | 0 | 0.51 | 0.45 |
| Example 6 | 8 | 0 | 0 | 0.33 | 1.84 |
| Example 7 | 9 | 1 | 0 | 0.35 | 2.57 |
| Example 8 | 0 | 12 | 0 | 0.33 | 2.47 |
| Example 9 | 0 | 11 | 0 | 0.36 | 2.67 |
| Example 10 | 2 | 0 | 0 | 0.50 | 0.78 |
| Example 11 | 1 | 0 | 0 | 0.48 | 0.81 |
| Example 12 | 2 | 0 | 0 | 0.20 | 0.80 |
| Example 13 | 1 | 0 | 0 | 0.63 | 0.76 |
| Example 14 | 2 | 0 | 0 | 0.75 | 0.78 |
| Comparative Example 1 | 1 | 0 | 0 | 0.10 | 0.77 |
| Comparative Example 2 | 0 | 0 | 0 | 0.94 | 0.76 |
| Comparative Example 3 | 1 | 7 | 0 | 0.60 | 0.76 |
| Comparative Example 4 | 2 | 0 | 0 | 0.60 | 0.10 |
| Comparative Example 5 | 0 | 14 | 0 | 0.80 | 0.82 |
| Comparative Example 6 | 1 | 0 | 0 | 0.50 | 0 |

| | Composition (% by mass) Of Glass Phases | | | | | |
|---|---|---|---|---|---|---|
| No. | SiO$_2$ | MgO | Al$_2$O$_3$ | TiO$_2$ | Na$_2$O | K$_2$O |
| Example 1 | 63.4 | 7.4 | 23.1 | 1.6 | 3.2 | 1.2 |
| Example 2 | 63.2 | 7.5 | 23.2 | 1.6 | 3.3 | 1.2 |
| Example 3 | 62.1 | 3.9 | 23.8 | 5.7 | 2.7 | 1.8 |
| Example 4 | 61.6 | 4.2 | 23.9 | 5.8 | 2.8 | 1.7 |
| Example 5 | 66.3 | 3.5 | 22.8 | 3.9 | 2.5 | 1.0 |
| Example 6 | 62.6 | 8.0 | 22.4 | 2.8 | 2.4 | 1.8 |
| Example 7 | 60.2 | 8.0 | 25.3 | 2.1 | 3.0 | 1.4 |
| Example 8 | 66.9 | 5.5 | 22.0 | 2.2 | 2.4 | 1.0 |
| Example 9 | 70.8 | 3.6 | 18.9 | 2.9 | 2.3 | 1.4 |
| Example 10 | 63.7 | 7.3 | 22.9 | 1.8 | 3.1 | 1.1 |
| Example 11 | 62.1 | 5.5 | 23.8 | 5.2 | 2.5 | 0.9 |
| Example 12 | 49.6 | 6.2 | 34.5 | 5.8 | 2.8 | 1.1 |
| Example 13 | 69.1 | 3.6 | 21.2 | 3.5 | 1.8 | 0.7 |
| Example 14 | 69.9 | 3.5 | 20.7 | 4.2 | 1.2 | 0.5 |
| Comparative Example 1 | 44.5 | 8.8 | 36.4 | 6.6 | 2.4 | 1.3 |
| Comparative Example 2 | 70.3 | 4.2 | 19.7 | 3.3 | 1.7 | 0.8 |
| Comparative Example 3 | 63.2 | 6.8 | 23.4 | 3.1 | 2.4 | 1.1 |
| Comparative Example 4 | 71.2 | 1.0 | 18.0 | 7.2 | 2.0 | 0.6 |

TABLE 3-continued

| No. | Glass Phases Average Size (μm) | Glass Phases Area Ratio (%) | Glass Phases Mass Ratio (% by mass) | Crystal Phases Number Of Microcracks |
|---|---|---|---|---|
| Example 1 | 14.5 | 3.8 | 3.5 | 89 |
| Example 2 | 15.1 | 4.0 | 3.6 | 110 |
| Example 3 | 2.5 | 4.2 | 4.2 | 124 |
| Example 4 | 3.2 | 3.9 | 4.1 | 137 |
| Example 5 | 14.5 | 4.8 | 4.2 | 96 |
| Example 6 | 12.0 | 4.5 | 4.0 | 89 |
| Example 7 | 3.2 | 4.2 | 3.9 | 117 |
| Example 8 | 13.1 | 4.9 | 3.7 | 103 |
| Example 9 | 2.5 | 4.6 | 3.4 | 106 |
| Example 10 | 5.6 | 5.2 | 4.0 | 82 |
| Example 11 | 6.3 | 4.9 | 3.9 | 96 |
| Example 12 | 9.8 | 2.0 | 1.6 | 82 |
| Example 13 | 5.2 | 7.5 | 4.9 | 96 |
| Example 14 | 6.3 | 8.1 | 6.1 | 69 |
| Comparative Example 1 | 6.5 | 0.5 | 0.9 | 48 |
| Comparative Example 2 | 11.4 | 13.0 | 10.1 | 34 |
| Comparative Example 3 | 32.0 | 3.8 | 3.8 | 48 |
| Comparative Example 4 | 25.0 | 4.0 | 3.4 | 48 |
| Comparative Example 5 | 31.5 | 5.8 | 4.2 | 69 |
| Comparative Example 6 | 23.5 | 3.5 | 3.6 | 34 |

| No. | Cell Walls Porosity (%) | Cell Walls Average Pore Size (μm) | Cell Walls Pore Distribution Deviation σ | Cell Walls Air Permeability (×10⁻¹² m²) |
|---|---|---|---|---|
| Example 1 | 45.2 | 23.5 | 0.24 | 2.4 |
| Example 2 | 42.3 | 24.5 | 0.23 | 2.5 |
| Example 3 | 55.3 | 18.2 | 0.21 | 2.1 |
| Example 4 | 50.0 | 12.0 | 0.26 | 1.8 |
| Example 5 | 52.3 | 21.5 | 0.27 | 2.2 |
| Example 6 | 46.0 | 27.5 | 0.21 | 3.2 |
| Example 7 | 52.0 | 18.0 | 0.24 | 1.8 |
| Example 8 | 47.5 | 22.0 | 0.22 | 2.4 |
| Example 9 | 57.8 | 19.8 | 0.25 | 2.2 |
| Example 10 | 51.0 | 13.8 | 0.25 | 1.6 |
| Example 11 | 49.0 | 10.5 | 0.23 | 1.2 |
| Example 12 | 58.0 | 20.0 | 0.22 | 2.8 |
| Example 13 | 56.0 | 21.2 | 0.32 | 2.7 |
| Example 14 | 57.0 | 19.9 | 0.35 | 2.4 |
| Comparative Example 1 | 54.0 | 18.7 | 0.25 | 2.2 |
| Comparative Example 2 | 42.2 | 15.7 | 0.25 | 1.8 |
| Comparative Example 3 | 44.5 | 24.0 | 0.24 | 2.6 |
| Comparative Example 4 | 58.1 | 22.3 | 0.22 | 3.0 |
| Comparative Example 5 | 42.3 | 12.9 | 0.32 | 0.9 |
| Comparative Example 6 | 57.2 | 18.0 | 0.25 | 2.8 |

| No. | A-Axis Compression Strength (MPa) | Thermal Expansion Coefficient (×10⁻⁷/° C.) | Thermal Stability at 1100° C.[1] |
|---|---|---|---|
| Example 1 | 6.0 | 1.7 | 98 |
| Example 2 | 6.5 | −4.2 | 99 |
| Example 3 | 4.5 | 4.8 | 98 |
| Example 4 | 5.8 | 1.2 | 97 |
| Example 5 | 4.1 | 3.8 | 98 |
| Example 6 | 6.2 | 3.6 | 99 |
| Example 7 | 4.5 | 6.3 | 99 |
| Example 8 | 5.7 | 4.6 | 98 |
| Example 9 | 4.2 | 5.2 | 99 |
| Example 10 | 7.0 | 2.3 | 98 |
| Example 11 | 8.0 | 9.7 | 98 |
| Example 12 | 4.0 | 11.2 | 96 |
| Example 13 | 5.5 | 7.8 | 98 |
| Example 14 | 3.8 | 11.5 | 99 |
| Comparative Example 1 | 1.5 | 14.0 | 93 |
| Comparative Example 2 | 4.0 | 14.0 | 97 |
| Comparative Example 3 | 4.5 | 13.0 | 98 |
| Comparative Example 4 | 1.8 | 15.0 | 82 |
| Comparative Example 5 | 7.0 | 15.0 | 99 |
| Comparative Example 6 | 2.5 | 22.0 | 51 |

Note:
[1]Expressed by the amount (%) of aluminum titanate remaining after kept at 1100° C. in an atmosphere for 100 hours.

As shown in Tables 1-3, it was confirmed that the honeycomb structures of Examples 1-14 within the present invention produced with molar ratios of titania powder to alumina powder in a range of 47/53 to 53/47, and with 1-6 parts by mass of silica powder and 0.5-5 parts by mass of magnesia powder having an average particle size of 5 μm or less added based on the total amount of titania powder and alumina powder, at temperature-elevating speeds of 10° C./hr or more between 1300° C. and 1350° C. and sintering temperatures of 1450-1650° C., contained main crystals of aluminum titanate in which $SiO_2$ and MgO are dissolved to form a solid solution, and glass phases containing MgO and $SiO_2$, the glass phases having area ratios of 2-8% and containing 2.5-15% of MgO. These honeycomb structures had porosities of 40-70%, average pore sizes of 10-40 μm, pore distribution deviations of 0.4 or less, air permeability of $1.2 \times 10^{-12}$ m² or more in cell walls, A-axis compression strengths of 3.8 MPa or more, and thermal expansion coefficients of $12 \times 10^{-7}$/° C. or less in cell walls, the ratios of the aluminum titanate crystals remaining when kept at 1100° C. for 100 hours being 95% or more, thereby having low pressure loss, high strength, high heat shock resistance, and high thermal stability at 1100° C.

On the other hand, the honeycomb structure of Comparative Example 1, in which the amount of silica was less than 1%, had a small area ratio of glass phases, resulting in low A-axis compression strength and a large thermal expansion coefficient. The honeycomb structure of Comparative Example 2, in which the amount of silica was more than 6%, had a large area ratio of glass phases, resulting in a low A-axis compression strength and a large thermal expansion coefficient. The honeycomb structure of Comparative Example 3 produced by a sintering temperature higher than 1650° C. had a large average size of glass phases, resulting in a low A-axis compression strength and a large thermal expansion coefficient. The honeycomb structure of Comparative Example 4, in which magnesia had an average particle size of more than 2 μm, the amount of magnesia was less than 0.5%, and alumina had an average particle size of more than 10 μm had glass phases containing less than 2.5% of MgO, a low A-axis compression strength, and a large thermal expansion coefficient. The honeycomb structure of Comparative Example 5, in which the amount of magnesia was more than 5%, had glass phases containing more than 15% of MgO, with cell walls having small air permeability and a large thermal expansion coefficient. The honeycomb structure of Comparative Example 6, to which magnesia was not added, had a small number of microcracks, resulting in a low A-axis compression strength and a large thermal expansion coefficient. Further, because MgO was not dissolved in main crystals of aluminum titanate, it had extremely low thermal stability.

Example 15

The honeycomb structure produced in Example 1 had a shape having an outer diameter of 152 mm, a length of 152 mm, a cell wall thickness of 0.25 mm and a cell wall pitch of 1.4 mm, and porosity of 45.2%, an average pore size of 23.5 µm, a pore distribution deviation of 0.24 and air permeability of $2.4\times10^{-12}$ m$^2$. This honeycomb structure had main crystals of aluminum titanate, in which MgO and SiO$_2$ are dissolved to form a solid solution, and glass phases. After its flow paths were alternately plugged by a known method in a checkerboard pattern at both ends, a peripheral portion of this honeycomb structure was removed by machining to an outer diameter of 141 mm. Longitudinal grooves defined by peripheral cell walls were filled with a coating material containing 5 parts by mass, on a solid basis, of colloidal silica per 100 parts by mass of aluminum titanate powder, and dried to form an outer peripheral wall, thereby providing a honeycomb filter having the structure shown in FIGS. 1(*a*) and 1(*b*), which had an outer diameter of 144 mm, a length of 152 mm, a cell wall thickness of 0.25 mm, and a cell wall pitch of 1.4 mm.

Comparative Example 7

Using cordierite-forming materials, a practical cordierite-based honeycomb filter having the structure shown in FIGS. 1(*a*) and 1(*b*) was produced by a known method. This honeycomb filter had an outer diameter of 152 mm, a length of 152 mm, a cell wall thickness of 0.3 mm, a cell wall pitch of 1.57 mm, porosity of 63%, an average pore size of 22 µm, a pore distribution deviation of 0.7, and air permeability of $3.2\times10^{-12}$ m$^2$.

Ceramic honeycomb filters obtained in Example 15 and Comparative Example 7 were measured with respect to pressure loss characteristics. The pressure loss characteristics were evaluated by pressure difference between upstream and downstream of the ceramic honeycomb filter fixed to a pressure loss test stand, when air was supplied at a flow rate of 4 Nm$^3$/min. As a result, the honeycomb filter of Example 15 had pressure loss of 100 mmAq, while the honeycomb filter of Comparative Example 7 had pressure loss of 90 mmAq. It was confirmed that the honeycomb filter of Example 15 produced by using the aluminum-titanate-based ceramic honeycomb structure of the present invention had low pressure loss characteristics equal to those of the practical cordierite-based honeycomb filter.

EFFECT OF THE INVENTION

Optimizing the compositions and sizes of main crystals of aluminum titanate, in which MgO and SiO$_2$ are dissolved to form a solid solution, and glass phases existing therebetween, the aluminum-titanate-based ceramic honeycomb structure of the present invention have improved heat shock resistance, pressure loss characteristics, thermal stability (800-1250° C.) and strength, particularly suitable for large ceramic honeycomb filters for diesel engines, which have high porosity and outer diameters of more than 200 mm.

The method of the present invention can optimize the composition and size of glass phases in aluminum-titanate-based ceramics comprising main crystals of aluminum titanate, in which MgO and SiO$_2$ are dissolved to form a solid solution, and glass phases, thereby easily producing the aluminum-titanate-based ceramic honeycomb structure of the present invention.

Using the starting material powder of the present invention, the aluminum-titanate-based ceramic honeycomb structure of the present invention can be produced easily.

What is claimed is:

1. A ceramic honeycomb structure having a large number of flow paths partitioned by porous cell walls, said cell walls comprising at least main crystals of aluminum titanate, in which MgO and SiO$_2$ are dissolved to form a solid solution, and glass phases; said glass phases containing 40-80% by mass of SiO$_2$ and 1-20% by mass of MgO; the average size of said glass phases being 30 µm or less in a cross section of said cell walls; and the area ratio of said glass phases to the total area of said main crystals of aluminum titanate and said glass phases being 2-7.5% in a cross section of said cell walls.

2. The aluminum-titanate-based ceramic honeycomb structure according to claim 1, wherein the amounts of MgO and SiO$_2$ dissolved in said main crystals are 0.2-5% by mass and 0.1-1.5% by mass, respectively.

3. The aluminum-titanate-based ceramic honeycomb structure according to claim 1, wherein said porous cell walls have porosity of 40-70%, an average pore size of 10-40 µm, and a pore distribution deviation σ[=log(D20)−log(D80)] of 0.4 or less, wherein D20 represents a pore size (µm) at a pore volume corresponding to 20% of the total pore volume, and D80 represents a pore size (µm) at a pore volume corresponding to 80% of the total pore volume, both in a curve representing the relation between the pore size and the cumulative pore volume (pore volume accumulated in a range from the maximum pore size to a particular pore size), and D80<D20.

4. The aluminum-titanate-based ceramic honeycomb structure according to claim 1, wherein said cell walls have air permeability of $2\times10^{-12}$ m$^2$ or more.

5. The aluminum-titanate-based ceramic honeycomb structure according to claim 1, wherein said honeycomb structure has an A-axis compression strength of 4 MPa or more.

6. The aluminum-titanate-based ceramic honeycomb structure according to claim 1, wherein said cell walls have a thermal expansion coefficient of $12\times10^{-7}$/° C. or less.

7. The aluminum-titanate-based ceramic honeycomb structure according to claim 1, wherein 95% or more of the aluminum titanate remains after said cell walls are kept in an atmosphere at 1100° C. for 100 hours.

8. A ceramic honeycomb structure having a large number of flow paths partitioned by porous cell walls, said cell walls comprising at least main crystals of aluminum titanate, in which MgO and SiO$_2$ are dissolved to form a solid solution, and glass phases; said glass phases containing 40-80% by mass of SiO$_2$ and 1-20% by mass of MgO; the average size of said glass phases being 30 µm or less in a cross section of said cell walls; and the mass ratio of said glass phases to the total of said main crystals of aluminum titanate and said glass phases being 1.6-4.9% by mass.

9. A starting material powder for producing an aluminum-titanate-based ceramic honeycomb structure comprising at least main crystals of aluminum titanate, in which MgO and SiO$_2$ are dissolved to form a solid solution, and glass phases, said starting material powder comprising 100 parts by mass of a powder material comprising alumina powder containing 0.05-0.5% by mass of Na$_2$O and titania powder containing 0.01-0.5% by mass of Na$_2$O at a molar ratio of 47/53 to 53/47, and at least 1-6 parts by mass of silica powder, and 0.5-5 parts by mass of magnesia source powder having an average particle size of 5 μm or less.

10. The starting material powder for producing an aluminum-titanate-based ceramic honeycomb structure according to claim 9, wherein said alumina powder contains 0.21-0.5% by mass of $Na_2O$.

* * * * *